Figure 1:
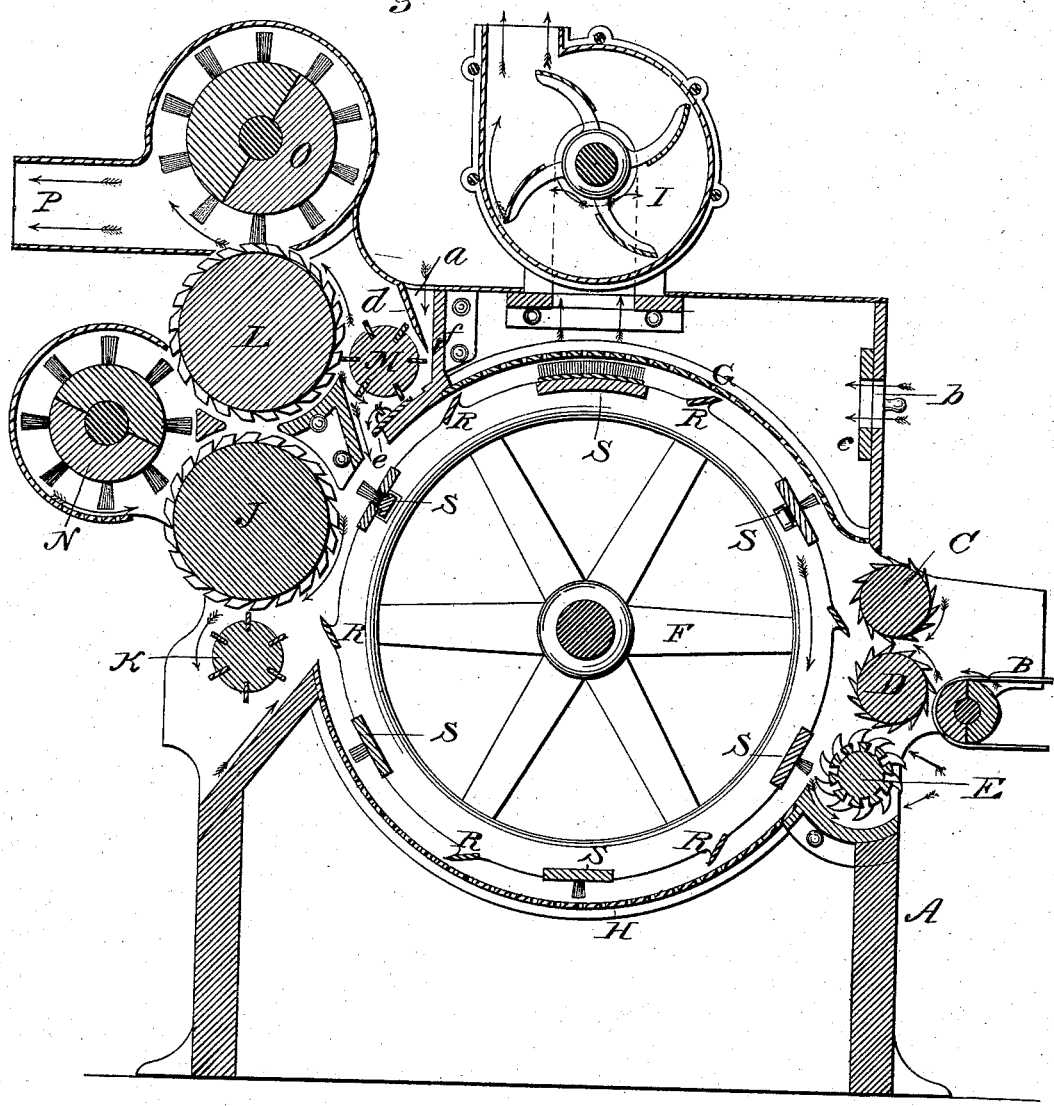

3 Sheets—Sheet 1.

C. G. & F. G. SARGENT.
MACHINES FOR PICKING AND BURRING WOOL, &c.

No. 194,110. Patented Aug. 14, 1877.

Witnesses:
Dom P. Twitchell
Will H. Dodge

Inventor:
C. G. and F. G. Sargent,
By their attys
Dodge & Son

3 Sheets—Sheet 2.
C. G. & F. G. SARGENT.
MACHINES FOR PICKING AND BURRING WOOL, &c.
No. 194,110. Patented Aug. 14, 1877.
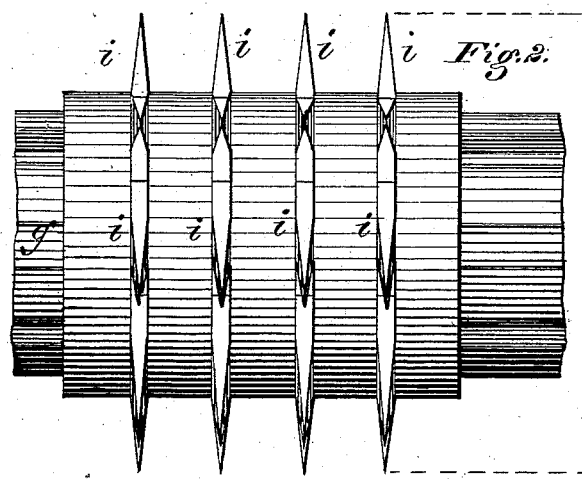
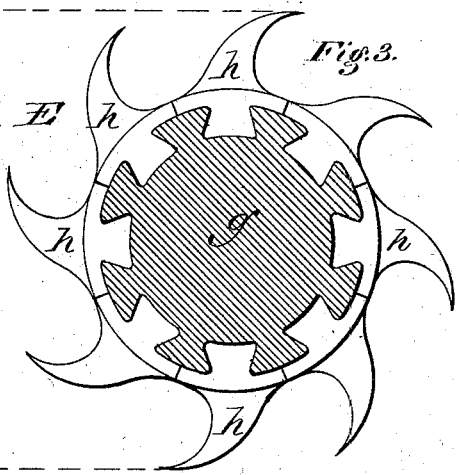
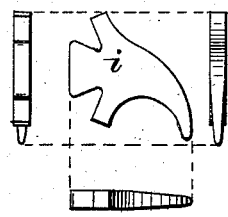
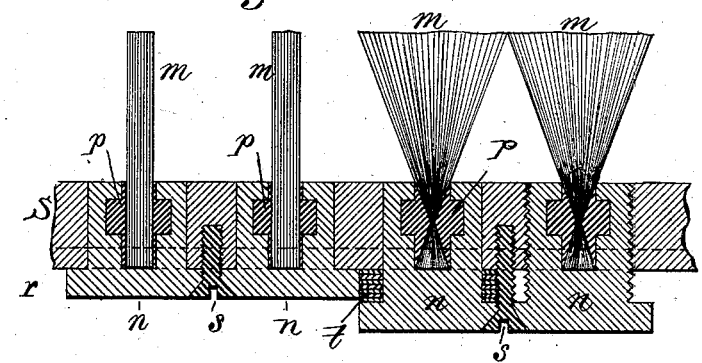
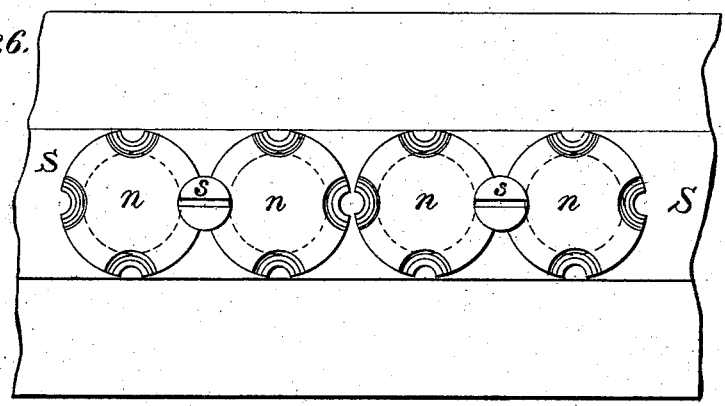
Witnesses:
Inventor:
C. G. and F. G. Sargent
By their attys
Dodge & Son

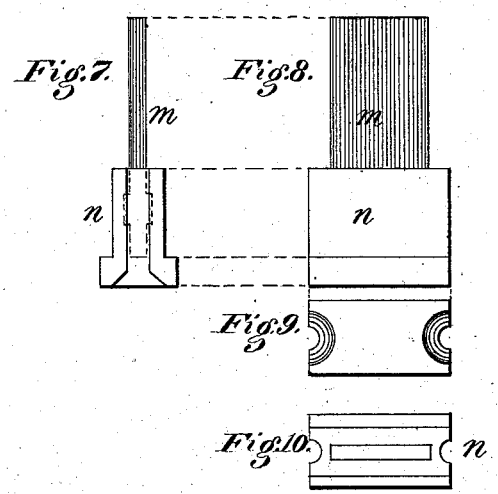
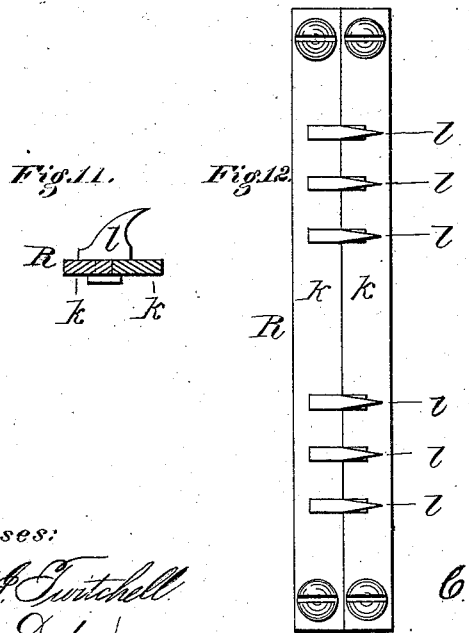

UNITED STATES PATENT OFFICE.

CHARLES G. SARGENT AND FREDERICK G. SARGENT, OF WESTFORD, MASS.

IMPROVEMENT IN MACHINES FOR PICKING AND BURRING WOOL, &c.

Specification forming part of Letters Patent No. 194,110, dated August 14, 1877; application filed September 11, 1876.

*To all whom it may concern:*

Be it known that we, CHARLES G. SARGENT and FREDERICK G. SARGENT, of Westford, in the county of Middlesex and State of Massachusetts, have invented certain Improvements in Machines for Picking and Burring Wool and other Fibers, of which the following is a specification:

Our invention consists in the use of a picker-roll arranged to open such locks of fiber as may chance to pass the feed-rolls; in the combination of brush and tooth lags on the picker-cylinder with toothed feed-rolls and a burring-cylinder; in improved detachable teeth and brushes for the picker-cylinder, and in the construction and combination of various other parts, hereinafter described.

Figure 1 represents a longitudinal vertical section through the center of the machine; Fig. 2, a side view of the working-roll for opening and picking the fiber as it passes from the feed-rolls to the picker-cylinder; Fig. 3, a cross-section of the same; Fig. 4, views showing the form of the teeth of the picker-roll; Fig. 5, a sectional view, illustrating the different modifications of the brushes of the picker-cylinder; Fig. 6, an inside or back view, illustrating the brushes of a circular form seated in place; Figs. 7, 8, 9, and 10, views illustrating a square form of brush for the picker-cylinder; Figs. 11 and 12, respectively, a cross-section and a face view of one of the toothed lags of the picker-cylinder.

In the drawings, A represents the frame of the machine, and B the endless feed-apron, by which the fiber is delivered between the two horizontal toothed feed-rolls C and D, located in the forward end of the frame. E represents a roller with curved teeth mounted below and parallel with the feed-rolls, for the purpose of picking and opening the fiber as it passes from the feed-rolls.

We are aware that it is common to use card-rolls and toothed rolls in picking-machines to strip the adhering fiber from the second feed-roll, the teeth of such stripping-roll being arranged to enter between those of the feed-roll, and being pointed in the direction in which the picker-cylinder revolves in order that they may release the fiber readily, and without retarding or detaining it. In our machine, on the contrary, we employ our third roll E for the express purpose of picking and opening the fiber, and to this end we arrange its teeth to point in the opposite direction to that in which the picking-cylinder revolves instead of in the same direction, and also arrange them to act against instead of between the teeth of the feed-roll, as clearly shown in the drawings. When the parts are thus arranged the unopened locks of wool which may chance to pass the feed-rolls are caught and held by the teeth of the roll E until thoroughly opened and disentangled, the clogging of the roll E being prevented by the second feed-roll D, which strips the loose fiber from the teeth of roll E and carries it back again into the machine.

The picking and loosening action of the roll E is assisted very materially by the lower feed-roll D, which performs the double duty of drawing the fiber inward and at the same time picking and loosening it, so as to release the impurities and admit of its being readily straightened out. F represents the horizontal picker-cylinder, inclosed in the middle of the machine, with curved gratings or perforated sheets of metal G and H arranged, the former closely above and the latter closely below it, as shown. The body of the machine is provided on top with an exhaust-fan, I, and is closed up around the cylinder and other parts in such manner that the air can only enter at the front and rear ends, through the bottom grating H, and through openings *a* and *b* made for the purpose in the top and end, respectively, as shown.

J represents a burring-cylinder located behind the picker-cylinder F, in such position as to receive the fiber therefrom, and K represents a guard-cylinder acting, in conjunction with the burring-cylinder J, to knock burrs and other foreign matters from the fiber. L represents a second burring-cylinder, arranged above and parallel with the cylinder J, and operating in connection with a second guard-cylinder, M, which is arranged in front of the said cylinder L, below the air-inlet *a*, as shown.

N represents a brush-cylinder, arranged between the two burring-cylinders for the purpose of transferring the fiber from the lower to the upper one, and in so doing taking out the loose dirt and turning the fiber over the other side outward. O represents a brush-cylinder, arranged above the upper burring-cylinder, to remove the fiber therefrom and discharge it from the machine. Suitable belts and pulleys, gearing, or other devices (not shown in the drawing) are arranged to give the various parts motion in the direction indicated in the drawings. The fan, exhausting the air from the interior of the machine, causes a strong draft inward through the lower grating and the openings $a b$, and past the feed-rolls and burring-cylinders, around the picker-cylinder, and thence out through the upper grating G, as indicated by the arrows. The fiber, being placed on the endless apron, is taken therefrom by the feed-rolls C and D and carried inward, and, by means of the roll D and picker-roll E, loosened and opened in such a manner as to set free much of the dirt and foreign matter, the fine light portions of which are drawn off through the fan I, while the heavier portions are carried inward and discharged through the bottom grate H. The current of air rushing inward past the feed and the picker rolls also serves to lighten and draw inward the fiber in such manner that it is prevented from winding on the rolls, as it would otherwise have a tendency to do. From the rolls the fiber is taken by the picker-cylinder F, and, being first acted upon thereby, is delivered to the first burring-cylinder, and thence passed by the brush N to the second burring-cylinder, and finally delivered by the brush-cylinder O from the machine through a spout, P. (Shown in the drawing.) The guard-cylinder K removes from the fiber, while it is on the lower burring-cylinder J, all adhering burrs, straws, sticks, and similar matters, and discharges the same from the machine. Any fiber which may be removed by either guard-cylinder will be drawn back by the air-current into the machine, where it will meet the main body of fiber and pass through therewith.

In order that the air-current may be nicely regulated, as required, so that it will have sufficient strength to return the loose fiber from the guard-cylinder to the machine, but not strength enough to draw in the burrs and other heavy matters, an adjustable slide or gate, $c$, is arranged over the air-inlet $b$, as shown, so that more or less air may be admitted at the front end of the machine, and thereby the draft at the rear end varied as required.

The brush-cylinder N, by which the fiber is transferred from the first to the second burring-cylinder, removes a considerable amount of dust and dirt, the fine portions of which are drawn off through the fan, while the heavy portions fall through perforations in the bottom of the case by which the brush is surrounded, to prevent the rush of air into the machine.

The opening $a$, admitting an inward current of air past the upper guard-cylinder, prevents the same from carrying any burrs over inward, as it might in some instances otherwise do.

In order to direct the current of air entering at $a$ in the proper direction, there is arranged between the opening and the guard-cylinder M a plate, $d$, which may be made adjustable to and from said cylinder.

For the purpose of controlling the inward draft through the opening $a$ a plate, $e$, is arranged adjustably on a cross-plate, $f$, which latter extends across the upper rear part of the interior of the machine, in front of the opening $a$, as shown, so as to prevent the entrance of air except in close proximity to the burring-cylinder.

The picker-roll E, arranged in the front of the machine, consists, as shown in Figs. 2, 3, and 4, of a shaft or roll, $g$, provided with longitudinal dovetail grooves, a series of separate teeth, $h$, having tongues which fit the grooves of the shaft, and a series of rings, $i$, slipped upon the shaft between the rows or lines of teeth, to hold them in position, and keep them the proper distances apart.

The required number of teeth to form a row or line around the shaft, one in each groove, are inserted in place, and a ring slipped up against them, and then another line of teeth inserted, and so on repeatedly until the roll is filled, when a nut is screwed upon the end of the shaft, to crowd and hold the parts all firmly together; or, instead of the nut, a washer and key or other device used for the same purpose. By applying the teeth in the above manner the roll is rendered cheap and strong in construction, and the insertion of new teeth rendered a simple and easy matter.

The picker-cylinder F is provided with lags R, having teeth of different sizes or degrees of fineness, the teeth of one being fine and the teeth of another coarse, whereby the action of the machine in opening and spreading the fiber is greatly improved over those in which the teeth of the cylinder are all of one size. The cylinder F is also provided, in addition to the toothed lags R, with lags S, armed with bristles, or a steel-wire brush, or card-clothing.

By the combination of the teeth and the brushes on one cylinder, so that they act alternately upon the fiber, the latter is spread and straightened with rapidity and evenness, the toothed lags serving to comb out and open all the hard masses of fiber, and the brushes following after to remove the loose dirt and impure matter which the teeth would allow to remain.

When carding wool or worsted waste, rags, &c., the toothed or comb lags are used in combination with the steel-wire brushes, the wire used in the brushes for carding being stiffer than that used for picking and cleaning simply.

The toothed lags used in combination with the brushes may be of any suitable construction, but we prefer the construction represented in Figs. 11 and 12, in which each lag consists of two longitudinal bars, k, arranged side by side, and provided in their contiguous edges with recesses to receive shouldered necks formed on the back of teeth l, which are made separately, and inserted between the two bars before the latter are secured together.

By thus constructing and securing the teeth they are held firmly in place, and at the same time their ready removal permitted independently of each other.

The brushes used with the toothed lags may also be constructed in any suitable manner, but it is preferred to make them in the manner shown in Figs. 5, 6, 7, 8, 9, and 10, in which the bunches or clusters of wire or bristles m are mounted in blocks or pockets n, seated in the lags in such manner that they may be adjusted and removed independently of each other. The blocks or pockets n are simply small pieces of metal, each having a central hole or cavity to receive the wire or bristles m, the cavity having an internal enlargement forming a space around the bristles or wires to receive solder, glue, or other equivalent material p, to retain the same in place.

The pockets may be provided at the rear end with an outside shoulder or flange, r, in which case they will be inserted through the lags of the cylinder from the inner or back side, and secured by screws s, passing into the lags and forcing the shoulders up against the same.

In order to admit of the brushes being moved outward to compensate for the shortening of the wire or bristles by wear, a series of thin washers, t, may be placed under the shoulders of the pockets n, and the wire or bristles made of increased length, as shown in Fig. 5, so that, by removing the washers one after another, the pockets will be permitted to move outward.

Another manner of securing and adjusting the pockets is to make them of a cylindrical form, provide them with a screw-thread on the exterior, and screw them into the lags, securing them from turning when in action by the screws s, as shown on the right-hand side in Fig. 5.

The essential feature of our brush is the use of the detachable independent pockets, the form and manner of securing the same being subject to modification.

We are aware that the combination of the two burring-cylinders with the intermediate card-cylinder, in the manner shown, is not original with us, and we therefore lay no claim thereto, except when combined and arranged in connection with the other parts in the special manner shown.

We are also aware that a lag provided with card-teeth, and capable of bodily adjustment radially, is not new, and we make no claim thereto, our improvement consisting in a lag having a series of brush-sections, each of which is adjustable and detachable independently of the others, and without moving the lag. We are also aware that a cylinder has been used having brushes and intermediate sheet-cards, the latter serving only to keep the fibers parallel to themselves until taken off by the doffers, and, therefore, we make no claim to said arrangement, nor, broadly, to a cylinder having both brush and tooth lags, our invention being limited in this regard to the combination of such cylinder with the toothed feed-rolls on one side and the burring-cylinder on the other, whereby the fiber is opened, straightened, and transferred in its straightened condition directly to the burring-cylinder.

Having thus described our invention, what we claim is—

1. The combination of the picker-cylinder F and feed-rolls C D with a picker-roll, E, arranged, as shown, with its teeth pointed in the opposite direction from that in which the picker-cylinder rotates, for the purpose of catching and detaining the unopened locks of wool.

2. In a picking and burring machine, the combination of a picker-cylinder, F, two burring-cylinders, J and L, and a rotary transfer-brush arranged, as shown, in such relation to each other that the fiber is all delivered from the picker-cylinder directly to the first burring-cylinder, and thence by the brush to the second burring-cylinder.

3. The combination of the picking-cylinder F, the burring-cylinders J L, guard-cylinders K M, transfer-brush N, the fan I, and the body or casing inclosing said parts, as shown, whereby the fiber is passed automatically from the picking-cylinder to the two burring-cylinders in succession, and at the same time subjected to the incoming currents of air.

4. In combination with the two burring-cylinders J L and the intermediate transfer-brush N, a fan, I, arranged to produce a current of air past the brush and between the cylinders, substantially as shown.

5. In combination with the outside casing and the burring-cylinder L and its guard-cylinder M, mounted therein, as shown, an air-inlet, a, and a deflector, d, located as shown and described, and for the purpose set forth.

6. In a picking and burring machine, the combination of two toothed feed-rolls, a rotary cylinder, provided with both toothed and brush lags and a burring-cylinder, said parts being arranged, as shown, so that the fiber is taken from the feed-rolls, opened and straightened, and delivered directly to the burring-cylinder.

7. In a toothed lag for a picker-cylinder, the combination of the parallel bars $k$, notched, as shown, and the series of necked and shouldered teeth seated in and between said bars, as shown.

8. A lag for a picker-cylinder provided with a series of small brushes detachable and adjustable radially independent of each other, substantially as shown and described.

9. In combination with a lag, S, a cylindrical pocket, $n$, provided with an exterior screw-thread, and with a central cluster of wires or bristles, substantially as shown.

CHARLES G. SARGENT.
FREDERICK G. SARGENT.

Witnesses:
ALLAN CAMERON,
ARTHUR B. PLIMPTON.